United States Patent
Shurkewitsch et al.

(10) Patent No.: US 11,226,264 B2
(45) Date of Patent: Jan. 18, 2022

(54) METHOD FOR THE DIAGNOSIS OF ENGINE MISFIRES IN AN INTERNAL COMBUSTION ENGINE

(71) Applicant: Volkswagen Aktiengesellschaft, Wolfsburg (DE)

(72) Inventors: Andre Shurkewitsch, Calberlah (DE); Heiko Sternberg, Wolfsburg (DE); Nikolaus Zimbalist, Edemissen (DE); Robert Wetten, Berlin (DE); Elmar Millich, Berlin (DE); Jan Vogelsang, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 17/007,804

(22) Filed: Aug. 31, 2020

(65) Prior Publication Data
US 2021/0063280 A1   Mar. 4, 2021

(30) Foreign Application Priority Data
Aug. 30, 2019   (DE) ...................... 10 2019 213 092.5

(51) Int. Cl.
*G01M 15/11*   (2006.01)
*F02D 41/14*   (2006.01)
(Continued)

(52) U.S. Cl.
CPC ......... *G01M 15/11* (2013.01); *F02D 41/1498* (2013.01); *F02D 35/023* (2013.01);
(Continued)

(58) Field of Classification Search
CPC .. G01M 15/11; F02D 41/1498; F02D 35/023; F02D 41/22; F02D 2200/101;
(Continued)

(56) References Cited

U.S. PATENT DOCUMENTS 3,924,457 A * 12/1975 Oshima .................. G01M 15/11
                                                    73/114.06
3,965,677 A *  6/1976 Goto ...................... F01N 3/2053
                                                       60/277
(Continued)

FOREIGN PATENT DOCUMENTS

DE         3835285 A1     4/1990
DE        19832020 C1     4/1999
(Continued)

*Primary Examiner* — Sizo B Vilakazi
*Assistant Examiner* — Brian R Kirby
(74) *Attorney, Agent, or Firm* — Muncy, Geissler, Olds & Lowe, P.C.

(57) ABSTRACT

A method for the diagnosis of engine misfires in an internal combustion engine having at least one cylinder, and includes the steps of: Determining exhaust back pressure values of the individual cylinders over at least two working cycles, correlating the exhaust back pressure values with the camshaft position and/or the working cycle, determining the exhaust back pressure maxima and/or exhaust back pressure minima per working cycle, comparing the exhaust back pressure maxima and/or exhaust back pressure minima between the individual cylinders—in the case of multiple cylinders—and/or to maximum and/or minimum values from previous working cycles and determining the deviations, comparing the deviations to a predetermined threshold value. The invention also relates to a control device for carrying out the method and a motor vehicle including such a control device.

12 Claims, 2 Drawing Sheets

(51) Int. Cl.
*F02D 35/02* (2006.01)
*F02D 41/22* (2006.01)
(52) U.S. Cl.
CPC ........ *F02D 41/22* (2013.01); *F02D 2200/101* (2013.01); *F02D 2200/1015* (2013.01)
(58) Field of Classification Search
CPC ......... F02D 2200/1015; F02D 41/1448; F02D 41/0085; F02D 41/008; G01L 23/24; F01L 2820/041
USPC ..................................... 73/114; 701/102, 111
See application file for complete search history.

(56) References Cited

U.S. PATENT DOCUMENTS

| | | | | |
|---|---|---|---|---|
| 4,424,709 | A * | 1/1984 | Meier, Jr. ............. | G01M 15/09 701/102 |
| 5,109,825 | A * | 5/1992 | Joos ....................... | F02P 11/06 123/479 |
| 5,415,036 | A * | 5/1995 | Park ..................... | G01M 15/106 60/227 |
| 6,202,415 | B1 | 3/2001 | Lohmann et al. | |
| 6,243,641 | B1 * | 6/2001 | Andrews ............... | G01M 15/08 123/436 |
| 7,899,608 | B1 * | 3/2011 | Pederson ............... | G01M 15/11 701/111 |
| 8,061,136 | B2 | 11/2011 | Delp et al. | |
| 2006/0207526 | A1 * | 9/2006 | Kassner ................ | F02P 5/1514 123/1 R |
| 2011/0093182 | A1 * | 4/2011 | Weber .................... | F02M 26/05 701/102 |
| 2014/0200852 | A1 * | 7/2014 | Kappaganthu ......... | G01M 15/11 702/183 |
| 2016/0265452 | A1 * | 9/2016 | Martin ................ | F02D 41/221 |
| 2017/0167424 | A1 * | 6/2017 | Glugla ................. | F02D 41/402 |

FOREIGN PATENT DOCUMENTS

| | | | |
|---|---|---|---|
| DE | 19950484 | A1 | 5/2000 |
| DE | 10028886 | A1 | 12/2001 |
| DE | 10230830 | A1 | 1/2004 |
| DE | 102006012858 | A1 | 9/2007 |
| DE | 102007039613 | B4 | 2/2009 |
| DE | 102009035700 | B3 | 6/2011 |
| DE | 102016002082 | A1 | 10/2016 |
| DE | 102015221447 | A1 | 5/2017 |
| DE | 102017101610 | A1 | 8/2018 |
| DE | 102017102874 | A1 | 8/2018 |
| DE | 102017009265 | A1 | 4/2019 |
| JP | 03285138 | A * | 12/1991 |
| JP | 04076250 | A * | 3/1992 |
| JP | 04109061 | A * | 4/1992 |
| JP | 05071408 | A * | 3/1993 |
| JP | 06317215 | A * | 11/1994 |
| JP | 2014118834 | A * | 6/2014 |

* cited by examiner

METHOD FOR THE DIAGNOSIS OF ENGINE MISFIRES IN AN INTERNAL COMBUSTION ENGINE

This nonprovisional application claims priority under 35 U.S.C. § 119(a) to German Patent Application No. 10 2019 213 092.5, which was filed in Germany on Aug. 30, 2019, and which is herein incorporated by reference.

BACKGROUND OF THE INVENTION

Field of the Invention

The present invention relates to a method for the diagnosis of engine misfires in an internal combustion engine and to a control device.

Description of the Background Art

Today's emissions legislation requires ever more precise fuel pre-control. For this purpose, precise calculation methods have already been introduced in the engine control device and are constantly being improved. Prerequisite for the exact calculation of the required fuel amount, however, is the precise knowledge of the camshaft positions, the pressure and temperature values and other input variables. Despite all efforts, however, components such as the cylinder head, camshafts or the pressure and temperature sensors remain subject to tolerance. Furthermore, cylinder-specific differences in the trapped fresh air mass result from pressure waves in the intake manifold and in the exhaust manifold, and also due to different lengths of inlet and outlet channels (temperature effects). During vehicle operation, these cylinder-specific differences cannot currently be detected using conventional measurement and calculation methods. During operation, these lead to cylinder-specific air/fuel ratios, which fall short of the desired air/fuel mixture (only on average). In the case of gasoline engines in particular, it must be ensured that the air/fuel ratio corresponds to the stoichiometric ratio, not only because in this case the catalytic converter has the highest conversion rate, but because increased deviations lead to engine misfires. The uncombusted air/fuel mixture then passes into the catalytic converter and, with sufficient exothermic reaction, the air/fuel mixture reacts further, thus leading to very high temperatures in the catalytic converter and to a possible destruction of the monolith.

To counter this disadvantage, it is known to detect engine misfires with the appropriate diagnostic procedures. A widespread diagnostic method is based on the high-frequency evaluation of the speed signal, on the basis of which the engine misfires are diagnosed via pattern recognition, namely via the detection of systematic signal oscillations.

The known methods for the evaluation of the speed signal require a high application effort and nevertheless do not allow for 100% detection because the speed signal is greatly prone to interference. This is based on various factors such as, for example, vibrations due to bad driving surface, resonants in the powertrain, turbulent combustion, pre-ignition, surface ignition, etc. So as to not erroneously diagnose misfires which did not take place, the operating space for the diagnostic function is restricted by using application parameters, thus allowing for the occurrence of misfires in these exempt areas.

In the past, the permissible exhaust gas limits were higher than they are today. Thus certain errors could be tolerated. Furthermore, control functions influencing the mixture such as, for example, charge path models and fuel path models have been further optimized, by means of which the occurrence of misfires has been reduced.

Various other methods are already known which detect or determine engine misfires in an internal combustion engine, not by evaluating the speed signal but on the basis of the measured exhaust back pressure.

Thus, for example, the German patent DE 10 2009 035 700 B3 discloses a method for the cylinder-selective detection of a missing or imperfectly performed ignition of the mixture in at least one cylinder of an internal combustion engine having at least one cylinder, wherein the exhaust gases are guided from the cylinders via an exhaust gas manifold, wherein a reference signal is formed which relates to the position of a piston of a cylinder at a specific time TO, wherein the pressure in the exhaust manifold is measured and the pressure signal in the exhaust manifold is evaluated over time as a function of the reference signal in relation to the undershoot of a threshold value. The threshold value is generated from the mean value of the pressure signal.

The German patent application DE 10 2017 009 265 A1 discloses a method for determining engine misfires in an internal combustion engine having a plurality of cylinders and at least one exhaust manifold common to the cylinders, in which exhaust gas flows out of the cylinders during fired operation, with the steps of: detecting a pressure prevailing in the exhaust manifold by means of a pressure sensor; and determining the misfiring as a function of at least one signal characterizing the detected pressure; in which, in particular, the following steps are carried out: integrating the signal over a predeterminable range in which there is a number of measurement points, whereby an integral is formed; dividing the integral by the number of measurement points; and determining the engine misfire as a function of the division.

In another model-based method according to DE 10 2016 002 082 A1, a method for determining engine misfires in an internal combustion engine comprising a plurality of cylinders is described. In the method, a plurality of different signals that characterize each combustion of the respective cylinder segment is detected for each cylinder segment within a working cycle of the internal combustion engine. The respective signals are weighted as a function of the speed and load of the internal combustion engine, whereby respective input variables are formed. The input variables are summed up to form a sum value. Furthermore, at least one engine misfire occurring within the working cycle is determined for each cylinder of the internal combustion engine as a function of the sum value.

The known measures, however, take into account only the absolute exhaust back pressure value and compare it to a threshold value. This has the disadvantage that the exhaust back pressure is changed by many influencing variables such as ambient pressure, load, speed, and the position of the turbocharger control device. It is therefore very time-consuming to differentiate the change in the exhaust back pressure caused by these influencing variables from the change caused by an engine misfire. The method is therefore either error-prone or requires high data input.

On the other hand, methods are known which initially include computational processing of the exhaust back pressure signal. Only the mean values or integral values are considered, or other parameters are also considered so as to execute a less faulty comparison. However, this leads to a lower selectivity with regard to the individual incidents of the engine misfires. In particular at low exhaust gas pressure levels, it is almost impossible to detect misfires since the differences between a burning cylinder and a non-burning cylinder in this area are very small.

SUMMARY OF THE INVENTION

It is therefore an object of the present invention to provide a method and a control device for the diagnosis of engine misfires of an internal combustion engine, by means of which the disadvantages of the prior art are at least partially overcome. In particular, the method should have a high degree of selectivity while simultaneously requiring a low computing effort.

According to a first aspect, the invention relates to a method for diagnosing engine misfires in an internal combustion engine having at least one cylinder.

According to a second aspect, the invention relates to a control device for diagnosing engine misfires in an internal combustion engine, the control device being designed to carry out a method according to the first aspect.

According to the invention, it is proposed to provide a method with which engine misfires in the internal combustion engine can be diagnosed in such a way that the following steps are performed: determining exhaust back pressure values of the at least one cylinder by means of at least one working cycle, correlating the exhaust back pressure values to the camshaft position and/or the working cycle, determining the exhaust back pressure maxima and/or the exhaust back pressure minima per working cycle, comparing the exhaust back pressure maxima and/or the exhaust back pressure minima between the individual cylinders (in the case of multiple cylinders) and/or to maximum/or minimum values of previous working cycles and determining the deviations, comparing the deviations to a previously defined threshold value. If only one cylinder is present, the exhaust back pressure maxima and/or maximum and/or minimum values from previous working cycles are compared and the deviations are determined.

In the context of the present invention, the term "engine misfires" includes, for example, both the failure to ignite the gas-fuel mixture in the cylinder and an incomplete or delayed ignition of the mixture. Therefore, not only the absence of the ignition or the ignition spark is meant, especially since the absence of the ignition or the ignition spark is only one of several causes of engine misfires.

The internal combustion engine can be a gasoline engine or a diesel engine.

During the exhaust stroke, exhaust gas is discharged from the respective cylinder into the exhaust manifold by opening at least one or more exhaust valves that are assigned to the respective cylinder. Thus, the pressure in the exhaust manifold detected by the pressure sensor results from the exhaust stroke or from a pressure prevailing in the respective cylinder. In the exhaust duct, which is preferably adjacent to the exhaust valve, the exhaust back pressure may be measured by an exhaust back pressure sensor or calculated, for example, based on a plurality of measured values that are measured during the working cycle.

The working cycle (also known as an engine cycle) may include the steps intake, compression, power, exhaust. In a four-stroke engine, a working cycle of the internal combustion engine extends, for example, over two crankshaft revolutions.

The correlation of the exhaust back pressure values to the camshaft position and/or the working cycle can be carried out by communicating the time period, the working cycles and/or the camshaft or crankshaft position from the respective sensing devices to a control device performing the method.

The result is in particular a curve of the exhaust back pressure against the crankshaft angle.

The exhaust back pressure maxima and/or exhaust back pressure minima per cylinder can be determined with a curve discussion of the exhaust back pressure by calculating the extreme points. In particular, in each case the maximum and/or the minimum of the exhaust back pressure is determined directly after the exhaust valve has opened.

Subsequently, according to the invention, the exhaust back pressure maxima and/or exhaust back pressure minima thus determined are assigned to the individual cylinder. This can also be carried out using the parameters sent to the control device for the respective cylinder, for example the crankshaft angle, the time at which the exhaust valve is opened, the ignition sequence or the mass flows.

This is followed by a comparison of the maxima and/or minima thus determined between the individual cylinders and/or to maximum and/or minimum values from previous working cycles and a determination of the deviations. The determination of the deviations of the maximum and/or minimum values is preferably done by simple subtraction.

Finally, according to the invention, the deviations are compared to a previously established threshold value.

Utilizing the correlation between the extreme points of the exhaust back pressure profile and the engine misfires renders the described method robust against systematic and stochastic errors in a measured value acquisition of an exhaust back pressure sensor. Consideration and comparison of only the extreme positions of the exhaust back pressure between the cylinders and/or to corresponding previous extreme position values and only the respective differences to a preset threshold value also reduces computing effort and memory requirements. In addition, because of the inventive comparison initially taking place of only the maxima and/or minima between the cylinders, the selectivity of the method is considerably increased as compared to the previously known method. Furthermore, the method is almost independent of ambient conditions and driving maneuvers, and this without a high level of error correction effort.

In other words, it is a main idea of the present invention not to compare mean values or other pressure values initially calculated by an attempted error correction to an absolute threshold value that is also computed from mean values for the exhaust back pressure, but rather in contrast thereto, the core idea is to determine the extreme points of the exhaust back pressure curve against the crankshaft angle, to compare these to one another and to check only the difference values for each cylinder against a threshold value.

The invention presented here thus enables an extremely robust and reliable detection of engine misfires with a very high degree of selectivity. Based on the comparison of the relative difference values of only the extreme points, recognition can take place in a very simple manner that is not dependent on the operational fluctuations in the absolute exhaust back pressure values and therefore does not require complex error correction calculations or adjustment calculations. An engine misfire diagnosis according to the invention is even possible during driving operation, i.e. during momentum, since only the most recent incidents of combustion of the individual cylinders must be compared to one another and these are very close to one another in terms of time.

In some embodiments of the method, the method may comprise the following steps:

a) measuring the exhaust back pressure,
b) correlating the measured values with the time and/or the camshaft position and/or the working cycle,
c) determining the maxima and/or minima of the correlation curve from step b),
d) assigning the maxima and/or minima to at least one, preferably to each, individual cylinder,
e) comparing the maxima and/or minima between the cylinders and/or to previous values, and calculating the difference values, and
f) comparing the difference values to a previously determined threshold value.

In an example embodiment, step e) can be carried out before step d).

In one embodiment of the method according to the invention, the threshold value can be determined by measurements on a test stand.

The measurements are easy to carry out and require little effort. Corresponding data input can also take place once for a respective combustion engine type.

The threshold value can be adaptable as a function of the speed and/or the load.

In other words, not only a fixed threshold value for the difference of the minimum value or the difference of the maximum value may be stored in each case, but as a function of the speed and/or the engine load, adapted threshold values may be determined and stored in a retrievable manner for comparison.

The inventive method may further comprise receiving a sensor signal with a high temporal sampling rate by a high-resolution exhaust back pressure sensor, wherein the sensor signal represents the exhaust back pressure. The sampling rate can be in the range from 0.5 kHz to 3000 kHz, in particular in the range from 1 kHz to 1000 kHz. After correlation with another parameter such as the camshaft position and/or the working cycle, a curve of the temporal behavior of the exhaust back pressure can be obtained from the exhaust back pressure. The maxima and minima of the curves for each cylinder can thus be determined very precisely and the differences in the maxima and minima can provide precise statements about the differences between the cylinders with regard to combustion. From this, engine misfires can be diagnosed with a high degree of selectivity.

The present invention further relates to a control device for the diagnosis of engine misfires in an internal combustion engine having at least two cylinders. The control device is adapted to receive the exhaust back pressure values for each cylinder over at least two working cycles, to perform a correlation of the exhaust back pressure values to the camshaft position and/or the working cycle, to determine the exhaust back pressure maxima and/or exhaust back pressure minima per cylinder, to compare the exhaust back pressure maxima between the individual cylinders and to identify the deviations among themselves or with previous working cycles and to check the identified deviations against a predetermined threshold value.

The object of the electronic engine control device is to control all the actuators of the engine management system in such a way that the best possible engine operation results in terms of fuel consumption, exhaust emissions, performance and driving comfort. In order to accomplish this, many operating parameters must be recorded with sensors and processed using algorithms, i.e. computing processes running according to a fixed scheme. The result is signal curves with which the actuators are controlled.

The electronic engine control device uses sensors and setpoint generators to record the operating data required for controlling and regulating the engine.

Setpoint generators (e.g. switches) record settings made by the driver, such as the position of the ignition key in the ignition lock, the switch position of the climate control or the position of the control lever for the cruise control. Sensors record physical and chemical parameters and thus provide information about the current operating status of the engine.

Examples of such sensors are: Speed sensor for recognizing the crankshaft position and calculating the engine speed; Phase sensor for detecting the phasing (engine cycle) and the camshaft position in engines having camshaft phasers for adjusting the camshaft position; Engine temperature and intake air temperature sensor for calculating temperature-dependent correction variables; Knock sensor for detecting engine knock; Air mass meter and intake manifold pressure sensor for charge detection; Exhaust pressure sensor for measuring the exhaust back pressure, e.g. in front of the turbine; Exhaust gas temperature sensor; Air mass meter; or A probe for A control.

The signals of the sensors can be digital, pulsed or analog voltages. Input circuits in the control device or, in the future increasingly in the sensor, process all of these signals. They adapt the voltage level and thus adapt the signals for further processing in a microcontroller of the control device.

Signal processing in the control device includes, for example, calculating the injection system, the charge control, the ignition timing and dwell angle calculation, the charge calculation, the idle speed control, the lambda control, the knock control, the control of the fuel vapor retention system, the boost pressure control, the engine immobilizer, the cruise control or the engine speed limitation.

The control device may include a processor, such as a microprocessor, which is adapted to perform the described method for diagnosing engine misfires in internal combustion engines. The control device may further comprise a data memory in which a program is preferably stored containing instructions for the processor so as to control the same according to the described method. The data storage can also store the predetermined correlation and/or predetermined parameters for performing the described method, for example, the cylinder volume.

The control device can be integrated into an engine control of the motor vehicle. Alternatively, the control device can be designed as a separate unit.

In some embodiments, the control device may include an exhaust back pressure sensor or may be connectable to an exhaust back pressure sensor, for example via one of the signal inputs. The exhaust back pressure sensor can be designed to output a sensor signal with a high temporal sampling rate, which represents the exhaust back pressure.

The present invention further relates to a motor vehicle with an internal combustion engine and a control device for diagnosing engine misfires of the internal combustion engine, as described above. The internal combustion engine comprises at least one cylinder, preferably at least two cylinders, in each case an inlet valve via which the cylinder is connected to an air supply, and in each case an outlet valve via which the cylinders are connected to an exhaust duct. The internal combustion engine can be an Otto engine. The internal combustion engine can be a diesel engine, which can preferably be operated with extended variability in the valve train and/or which uses internal exhaust gas recirculation.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
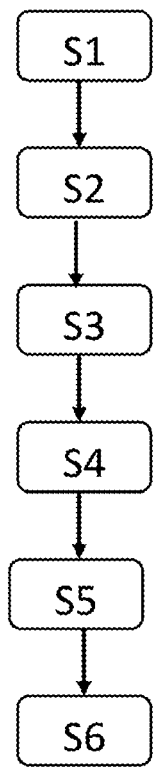
FIG. 1 shows a strongly schematic representation of a flow chart of an inventive method for diagnosing engine misfires in an exemplary embodiment of the invention.

FIG. 1 shows a flow chart of a method for diagnosing engine misfires in an internal combustion engine in an exemplary embodiment.

At S1, a sensor signal representing the exhaust back pressure is received by a high-resolution exhaust back pressure sensor. The exhaust back pressure sensor is designed to measure the exhaust back pressure at a high temporal sampling rate. For example, a value can be recorded every 6° crankshaft angles. The sensor signal thus provides values for the exhaust back pressure for a plurality of times in one, but preferably a plurality of, working cycles of the internal combustion engine.

At S2, the measured values of the exhaust back pressure sensor are correlated with the time and/or the camshaft position and/or the working cycle. The signal processing carried out in this way produces an exhaust back pressure curve, for example against the values of the crankshaft angle.

At S3, a curve discussion including identification of the extreme points is carried out and the respective maxima and/or minima of the curves are determined from S2. To do so, the maxima and/or minima are preferably determined directly after opening the outlet valve.

At S4, the maxima and/or minima are assigned to the individual cylinders. This can be done, for example, on the basis of the crankshaft angle or in correlation with the camshaft positions. It may be followed by a plausibility check of the association thus determined, which includes other operating parameters.

At S5, the maxima and/or minima of the exhaust back pressure of a respective cylinder are compared to the corresponding values of the other cylinders and/or to values from previous working cycles. This can be done by simple division.

At S6, finally the difference values of the exhaust pressure maxima and/or exhaust pressure minima from step S5 are compared to a previously determined threshold value. If the comparison shows that the determined difference between the exhaust pressure maxima is greater than the threshold value, an engine misfire is detected. If the determined difference between the extreme values is below the threshold value, no engine misfire has taken place.

Optionally, the threshold value, for example the speed and/or the load, can be adapted as an adaptation variable.

Figure 2:
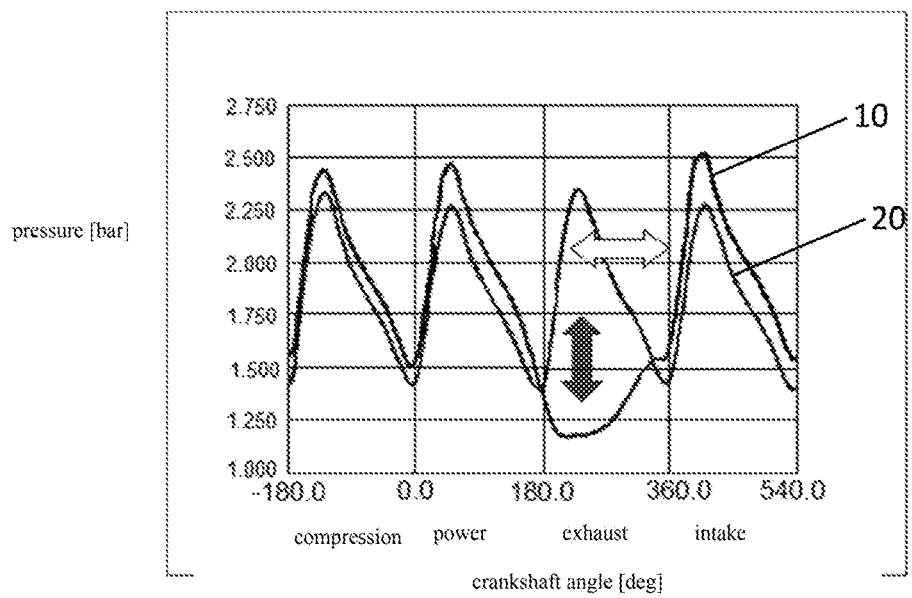
FIG. 2 shows a diagram to illustrate the method.

FIG. 2 shows a typical diagram of the pressure measurement signal 10, 20 in the exhaust manifold of an internal combustion engine over a working cycle, shown as cut from the crankshaft angle. In the curve 20, an exhaust back pressure behavior without engine misfires is shown. In contrast, curve 10 shows an exhaust back pressure behavior with an engine misfire. The curve shown here was identified for an internal combustion engine with turbocharging in the charged area, at a charge pressure of 1,500 mbar and a speed of 4500 in accordance with step S2 of the method according to the invention as shown in FIG. 1.

Figure 3:
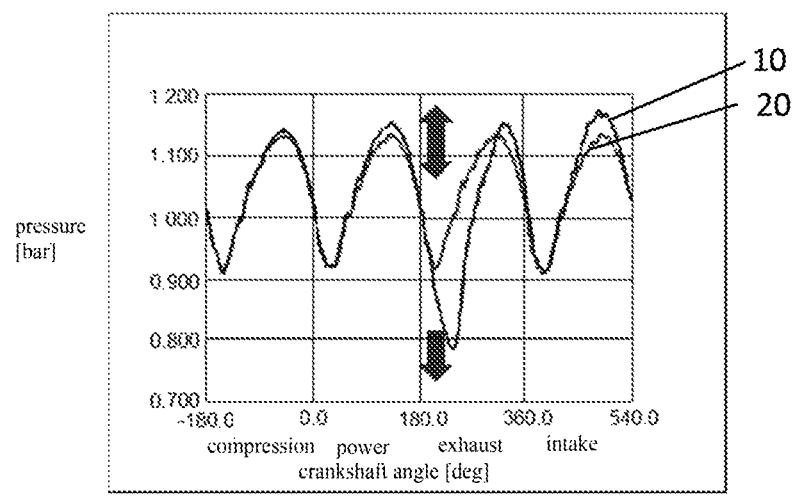
FIG. 3 shows a further diagram to illustrate the method.

FIG. 3 shows another typical diagram of the pressure measurement signal 10, 20 in the exhaust manifold of an internal combustion engine over a working cycle, shown as cut from the crankshaft angle. As in FIG. 2, curve 20 illustrates an exhaust back pressure behavior without engine misfires. In contrast, curve 10 shows an exhaust back pressure behavior with an engine misfire. The curve shown here was determined for an internal combustion engine without turbocharging in the intake area, at an intake pressure of 300 mbar and a speed of 4500 in accordance with step S2 of the inventive method as shown in FIG. 1.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for the diagnosis of engine misfires in an internal combustion engine having at least two cylinders, the method comprising:
   determining exhaust back pressure values of the at least two cylinders over at least one working cycle;
   correlating the exhaust back pressure values with at least one of a camshaft position or the working cycle;
   determining an exhaust back pressure maxima and an exhaust back pressure minima per working cycle;
   comparing the exhaust back pressure maxima and the exhaust back pressure minima between the at least two cylinders to determine deviations or comparing the exhaust back pressure maxima and the exhaust back pressure minima of each of the at least two cylinders with maximum and minimum values from previous working cycles to determine the deviations; and
   comparing the deviations to a previously established threshold value, wherein when the deviations are greater than the threshold value, an engine misfire is diagnosed.

2. The method according to claim 1, wherein the exhaust back pressure in the exhaust manifold is measured adjacent to the outlet valve using an exhaust back pressure sensor.

3. The method according to claim 1, wherein the method further comprises:
   measuring the exhaust back pressure;
   correlating measured values with at least one of the time, the camshaft position or the working cycle;
   determining the maxima and the minima of the correlation curve from the correlation step;
   assigning the maxima and the minima to at least one individual cylinder;
   comparing the maxima and the minima between the at least two cylinders or to previous values, and calculating the difference values, and comparing the difference values to a previously determined threshold value.

4. The method according to claim 1, wherein the threshold value is determined by measurements on a test stand.

5. The method according to claim 1, wherein the threshold value is adaptable as a function of speed and load.

6. The method according to claim 3, wherein the step of comparing is performed after the step of assigning.

7. The method according to claim 2, wherein exhaust back pressure values of the individual cylinders are determined using a high-resolution exhaust back pressure sensor.

8. The method according to claim 1, wherein a sampling rate of the exhaust back pressure sensor is in the range from 0.5 kHz to 3000 kHz.

9. A control device for diagnosis of engine misfires in an internal combustion engine, wherein the control device is configured to perform the method according to claim 1.

10. The control device according to claim 9, wherein the control device comprises at least one exhaust back pressure sensor or is connectable to at least one exhaust back pressure sensor, wherein the exhaust back pressure sensor is configured to output a sensor signal with a high temporal sampling rate, which represents the exhaust back pressure for the respective cylinder.

11. A motor vehicle comprising an internal combustion engine having at least two cylinders, which include in each case at least one inlet valve via which the cylinders are connected to an air supply, and at least one outlet valve via which each cylinder is connected to an exhaust duct and a control device for the detection of engine misfires in the internal combustion engine according to claim 9.

12. The method according to claim 1, wherein a sampling rate of the exhaust back pressure sensor is in the range from 1 kHz to 1000 kHz.

* * * * *